(12) United States Patent
Seppä et al.

(10) Patent No.: US 9,322,906 B2
(45) Date of Patent: Apr. 26, 2016

(54) WIRELESS MEMS SENSOR AND METHOD OF READING THE SAME

(75) Inventors: Heikki Seppä, Espoo (FI); Ville Viikari, Espoo (FI)

(73) Assignee: Teknologian tutkimuskeskus VTT Oy (FI)

( * ) Notice: Subject to any disclaimer, the term of this patent is extended or adjusted under 35 U.S.C. 154(b) by 397 days.

(21) Appl. No.: 13/395,706

(22) PCT Filed: Sep. 10, 2010

(86) PCT No.: PCT/FI2010/050697
§ 371 (c)(1), (2), (4) Date: Apr. 2, 2012

(87) PCT Pub. No.: WO2011/030002
PCT Pub. Date: Mar. 17, 2011

(65) Prior Publication Data
US 2012/0176609 A1  Jul. 12, 2012

(30) Foreign Application Priority Data
Sep. 14, 2009  (FI) ..................... 20095944

(51) Int. Cl.
G01L 9/06 (2006.01)
G01S 13/75 (2006.01)
G01L 19/00 (2006.01)
G01L 9/00 (2006.01)

(52) U.S. Cl.
CPC ............. *G01S 13/753* (2013.01); *G01L 9/0008* (2013.01); *G01L 19/00* (2013.01)

(58) Field of Classification Search
None
See application file for complete search history.

(56) References Cited

U.S. PATENT DOCUMENTS

| | | | |
|---|---|---|---|
| 7,038,470 B1 | 5/2006 | Johnson | |
| 7,145,453 B2 | 12/2006 | Miller, Jr. et al. | |
| 8,826,742 B2 * | 9/2014 | Nakamura | B81B 3/0021 73/777 |
| 2008/0224568 A1 | 9/2008 | Kvisteroy et al. | |
| 2009/0027280 A1 | 1/2009 | Frangioni et al. | |
| 2012/0235847 A1 * | 9/2012 | Viikari et al. | 342/5 |
| 2013/0233086 A1 * | 9/2013 | Besling | G01L 9/12 73/724 |
| 2013/0336095 A1 * | 12/2013 | Seppa et al. | 367/137 |

FOREIGN PATENT DOCUMENTS

| | | |
|---|---|---|
| DE | 4117157 | 3/1993 |
| WO | WO95/18430 | 7/1995 |
| WO | WO2011/030002 | 3/2011 |
| WO | WO 2013132746 A1 * | 9/2013 ............ B81B 3/0021 |

OTHER PUBLICATIONS

Viikari et al; RFID MEMS Sensor concept Based on Intermodulation Distortion; IEEE Sensor Journal; Dec. 2009; pp. 1918-1923; vol. 9, No. 12.

(Continued)

*Primary Examiner* — Andre Allen (57) ABSTRACT

This document describes a wireless sensor comprising a MEMS resonator and an antenna directly matched thereto. Also a method of reading the wireless sensor is described. The method comprises illuminating the wireless sensor with electromagnetic energy at a first and second frequencies and receiving an intermodulation signal emitted by the wireless sensor in response to said electromagnetic energy at the first and second frequencies.

19 Claims, 3 Drawing Sheets

(56) References Cited

OTHER PUBLICATIONS

Viikari et al; Technical Solutions for Automotive Intermadulation Radar for Detecting Vulnerable Road Users; 2009 IEEE 69$^{th}$ Vehicular Technology Conference, Barcelona, Spain, Apr. 26-29, 2009; pp. 1-3.

Nummila; RFID and Wireless Sensors; Apr. 16, 2008; 4 pages.

Seepa; Functional Environment: The Future User Interface Based on RFID-Technology and Printable Electronics; 3$^{rd}$ International conference on Smart Systems, FRAMI; Seinajoki Centre on Technology and Innovation May 25-26, 2004; pp. 1-28.

\* cited by examiner

WIRELESS MEMS SENSOR AND METHOD OF READING THE SAME

TECHNICAL FIELD

The present invention relates generally to wireless sensors and methods of reading the wireless sensors.

In particular, the wireless sensor is of the type utilizing MEMS technology (Micro-Electro-Mechanical Systems).

BACKGROUND ART

Wireless sensors have a great deal of potential in numerous applications that are too expensive or impossible to monitor by wire. Wireless sensors are divided into battery-powered active devices containing a radio transmitter, semi-passive battery-assisted sensors using modulated backscattering technique, and fully passive sensors. The disadvantages of active sensors are their high cost and limitations due to the battery's lifetime. Existing passive and semi-passive wireless sensors are based either on silicon-based radio frequency identification (RFID) or surface acoustic wave (SAW) technology.

Advanced RFID technology enables low-cost passive and semi-passive tags (i.e., ID-sensors) with rewritable memory. The technology can be used to realize general sensor platform [1] (reference documents are specified in the list of references appended to this specification), and it has been used to realize for example temperature [2] and shock [3] sensors. The RFID technology has some drawbacks in sensor applications. The power rectifier that generates the required power for the IC limits both the highest operation frequency and the largest distance. Therefore, passive RFID tags are not feasible in applications where a high operation frequency or a large interrogation distance is required. High frequency enables the small antenna size and precise spatial localization of the tag.

SAW tags offer several advantages when used as a sensor: they are small, withstand harsh environment, enable a relatively long reading distance, are passive, and are inherently sensitive to some quantities without external sensor elements [4]. A disadvantage with SAW sensors is that they are expensive compared to silicon-based sensors due to higher prices of piezoelectric substrates. In addition, the highest operation frequency of a SAW sensor is limited by the line width of the metal pattern printed on the piezoelectric substrate and it is typically a few GHz.

The intermodulation distortion of MEMS devices have been studied in several articles. The intermodulation distortion in capacitive MEMS switches is approximated in [10] and [11]. These models assume small MEMS cantilever displacement and high bridge impedance and neglect the mechanical quality factor of the MEMS. More comprehensive analysis presented in [12] takes also fifth order non-linearities into account. Another approach based on Volterra-series is presented in [13]. An analytical model for intermodulation distortion due to contact heating in contacting MEMS switches is presented in [14]. In addition, the MEMS mixer-filters [15]-[18], also called mixlers, share somewhat similar operating principle to the proposed MEMS sensor.

Existing passive and semi-passive wireless sensors are based either on silicon-based radio frequency identification (RFID) or surface acoustic wave (SAW) technology. The RFID technology has some drawbacks in sensor applications. The power rectifier that generates the required power for the IC limits both the highest operation frequency and the largest distance. Therefore, passive RFID tags are not feasible in applications where a high operation frequency or a large interrogation distance is required. High frequency enables the small antenna size and precise spatial localization of the tag.

A disadvantage with SAW sensors is that they are expensive compared to silicon-based sensors due to higher prices of piezoelectric substrates. In addition, the highest operation frequency of a SAW sensor is limited by the line width of the metal pattern printed on the piezoelectric substrate and it is typically a few GHz.

DISCLOSURE OF INVENTION

Therefore, it is an object of the present invention to provide a new wireless sensor and a method reading the same.

According to an aspect of the invention, the wireless sensor comprises a MEMS resonator and an antenna directly matched thereto.

According to another aspect of the invention, the method of reading the wireless sensor comprises illuminating the wireless sensor with electromagnetic energy at a first and second frequencies and receiving an intermodulation signal emitted by the wireless sensor in response to said electromagnetic energy at the first and second frequencies.

Therefore, the invention provides a new wireless sensor and a method reading the same.

The invention also has several embodiments that may provide certain advantages over the previously known wireless sensors and their reading methods, at least in view of some particular measurement applications.

According to an embodiment, a passive wireless sensor or tag can be realized with the well-established MEMS technology. This wireless MEMS sensor enables very-low manufacturing costs, long reading distance, high frequencies, and compact tag size. In addition, the wireless sensors can be passive requiring no embedded electronics.

According to an embodiment, the wireless sensor, when illuminated at two harmonic frequencies, produces an intermodulation frequency, which is emitted to the reader. The interrogation method of the proposed sensor is somewhat similar to the harmonic radar concept, which was first proposed for traffic applications [5] and later was used for tracking insects [6]-[8]. However, as compared to the harmonic radar, the proposed method enables a smaller frequency offset between the transmitted and received signals which eases to fulfill the frequency regulations and facilitates circuit design. The interrogation method is proposed, for example, for automotive radars to detect pedestrians, bicyclists, and other road users who are high risk to serious injury in traffic accidents [9].

According to an embodiment, the MEMS device uses an electrical matching circuit and potentially very high mechanical quality factor of the MEMS to maximize the intermodulation distortion. These phenomena are neglected in the models presented in [10] and [11], while the complex models presented in [12] and [13] are unpractical for the purpose of this paper. Section II derives a simple but comprehensive model for the intermodulation response of the MEMS device.

According to an embodiment, it is possible to realize passive wireless low-cost sensors with the advanced MEMS technology. As compared to the existing passive wireless sensors, this embodiment offers longer read-out distance, higher read-out frequencies and inexpensive manufacturing technology. In addition, the MEMS sensor according to the embodiment can be designed to be sensitive to a large number of measurement quantities, such as temperature, strain, air pressure and humidity.

According to an embodiment, the sensor can be utilized in construction engineering for monitoring moisture in building structures and stresses in bridges and in automotive, traffic applications for monitoring road conditions and other environmental variables, and in mechanical applications for monitoring strain in for example large ball bearings. In addition, one appealing application area is medical sensors, for example sensors to be used inside blood vessels.

Existing wireless sensors (RFID) are limited in read-out distance due to the power rectifier needed. In addition, frequency over 1 GHz cannot be used without losing the distance. But the invention and its various embodiments may help in solving these problems because in many cases a rectifier is not needed and the frequency can be even 100 GHz or above. The intermodulation signal generated by two RF signals can also be used to make low frequency ac-dc converter with a moderate diode and thus more sophisticated long distance high frequency wireless sensor can be realized. If long read-out distance is not required, a very low transmitted power is sufficient. This enables MEMS sensor to be used e.g., in hospitals. The wireless MEMS sensor differs from existing sensors because it combines both wireless communication and sensor in a one silicon chip. CMOS logic is also used to make the system compatible with the existing protocols. CMOS can be easily integrated with MEMS technology and even in this case one chip solution can be realized.

According to an embodiment, the wireless MEMS sensor consists of a MEMS resonator that is electrically matched to an RF antenna. Two RF frequencies are used to activate the mechanical oscillation, which modulates the reflected RF signals. If power supply is needed e.g., for CMOS, the intermodulation voltage generated by the MEMS oscillation can be used as a high efficiency ac-dc converter. The wireless sensor can be used at least to measure temperature, strain, air pressure and humidity and possibly several other quantities as well. The principle of the sensor is described in more detail in the attached manuscript.

The invention has an embodiment, wherein a passive wireless sensor or tag that can be realized with the well-established MEMS technology. This wireless MEMS sensor enables very-low manufacturing costs, long reading distance, high frequencies, and compact tag size. In addition, the wireless sensors can be passive requiring no embedded electronics.

According to an embodiment, a passive wireless MEMS sensor consisting of an antenna directly matched to a MEMS resonator can be produced. When the sensor is actuated at two signals at different frequencies it replies at an intermodulation frequency. An analytical equation for the mixing efficiency of a MEMS sensor is derived and verified by harmonic balance simulations. The concept is demonstrated experimentally and shown to be feasible for realizing sensors or tags readable across large distances.

According to the embodiments, similar principle can be used also to realize passive millimeter wave identification (MMID) tags with large read-out distance.

In addition, the embodiments of the invention enable several other useful applications, e.g., implantable sensor in human vessel for monitoring blood pressure and heart beat.

The invention has also several other embodiments providing associated advantages.

BRIEF DESCRIPTION OF DRAWINGS

For a more complete understanding of the present invention and the advantages thereof, the invention is now described with the aid of the examples and with reference to the following drawings, in which.

BEST MODE FOR CARRYING OUT THE INVENTION

According to an embodiment, the wireless sensor comprised a MEMS resonator and an antenna directly matched thereto.

The wireless sensor can be comprised in a single silicon chip.

In an embodiment, the sensor is a passive sensor and the single silicon chip does not include a power rectifier nor a power source.

The wireless sensor can also comprise a logic circuit.

In an embodiment, the wireless sensor comprises a logic implemented by a CMOS circuit manufacture on a single silicon chip together with the MEMS resonator and the antenna.

The MEMS resonator of the wireless sensor typically has three MEMS parameters: the mechanical quality factor, the mechanical resonance frequency, and the electrical resonance frequency. In an embodiment, at least one of the three parameters is made sensitive to the measured quantity. The measured quantity itself can be temperature, strain, air pressure or humidity, for instance.

In an embodiment, the wireless sensor is adapted to emit electromagnetic signal at an intermodulation frequency when illuminated by electromagnetic energy at two different frequencies. This intermodulation frequency may be in the frequency range from 100 kHz to 300 GHz, typically from 1 GHz to 10 GHz. Ranges from 2 GHz to 10 GHz, or 5 GHz to 10 GHz are particularly interesting as the prior solution do not operate adequately at these frequencies.

An embodiment of the method of reading the wireless sensor comprises:
  illuminating the wireless sensor with electromagnetic energy at a first and second frequencies; and
  receiving an intermodulation signal emitted by the wireless sensor in response to said electromagnetic energy at the first and second frequencies.

The first and second frequencies can be selected such that they are in the frequency range from 100 kHz to 300 GHz, for example in the range from 1 GHz to 10 GHz. As above, particularly interesting range is from 2 GHz to 10 GHz.

The method may also comprise measuring the mechanical quality factor of the MEMS resonator by sweeping the first frequency and keeping the second frequency fixed.

The method makes it also possible to measure the mechanical resonance frequency of the MEMS resonator by sweeping the first frequency and keeping the second frequency fixed.

On the other hand, the electrical resonance frequency of the MEMS resonator can be measured by sweeping the first and second frequencies at a same rate.

In case at least one of said measured parameters of the wireless sensor is sensitive to a measured quantity, such as temperature, strain, air pressure or humidity, it is possible to calculate the measured quantity from the measured parameter.

In the following, the theory and examples are discussed more thoroughly.

1. Introduction

2. Theory of the Intermodulating Sensor 2.1. Dynamic Response of Cantilever

Let us consider an electrostatically actuated MEMS cantilever or fixed-fixed beam structure. Its dynamic response is given as [19]

$$m\frac{d^2}{dt^2}x + \eta\frac{d}{dt}x + kx = F, \quad (1)$$

where m is the effective mass of the cantilever, x is the cantilever displacement, $\eta$ is the damping coefficient, k is the effective spring constant and F is the external force affecting the cantilever. The amplitude of the vibration is given for harmonic force as [19]

$$\hat{x} = \frac{\hat{F}_\omega Q_m}{k}g_n(\omega, \omega_m, Q_m), \quad (2)$$

where $\hat{F}_\omega$ is the amplitude of the harmonic force at the frequency $\omega$, $Q_m = \omega_m m/\eta$ is the mechanical quality factor of the resonator, and $g_n$ is the normalized frequency response given as $$g_n(\omega, \omega_m, Q_m) = \frac{\omega_m}{\omega\sqrt{1 + \left(\frac{Q_m(\omega^2 - \omega_m^2)}{\omega\omega_m}\right)^2}}, \quad (3)$$

where $\omega_m$ is the mechanical resonance frequency of the cantilever. Considering the cantilever as an air-filled parallel-plate capacitor and assuming that a voltage V is applied over the capacitance, the electrical force is given as $$F = -\frac{d}{dx}\frac{V^2\varepsilon_0 A}{2(g_0 - x)} \approx \frac{C_0 V^2}{2g_0}, \quad (4)$$

where $\varepsilon_0$ is the permittivity of vacuum, A is the capacitor area, $g_0$ is the initial gap height of the capacitor, and $C_0 = \varepsilon_0 A/g_0$ is the initial capacitance. The displacement is assumed to be small (compared to $g_0$) in the first order Taylor approximation. When the cantilever is actuated with the voltage V consisting of two sinusoids, $\hat{V}_1 \sin\omega_1 t$ and $\hat{V}_2 \sin\omega_2 t$, the force contains four harmonic terms and is given as $$F(t) \approx \frac{C_0}{2g_0}\left\{\begin{array}{l}\frac{\hat{V}_1^2 + \hat{V}_2^2}{2} + \hat{V}_1\hat{V}_2\cos(\omega_2 - \omega_1)t - \\ \hat{V}_1\hat{V}_2\cos(\omega_2 + \omega_1)t - \\ \frac{\hat{V}_1^2}{2}\cos2\omega_1 t - \frac{\hat{V}_2^2}{2}\cos2\omega_2 t\end{array}\right\}. \quad (5)$$

Let us assume that the cantilever is grounded at DC and that the angular frequencies $\omega_1$ and $\omega_2$ are well above the mechanical resonance frequency $\omega_m$ of the cantilever mass-spring system. Then, the DC and high frequency force terms can be neglected and the amplitude of the vibration in (2) can be written as $$\hat{x} = \frac{C_0 \hat{V}_1 \hat{V}_2 Q_m}{2kg_0}g_n(\omega_\Delta, \omega_m, Q_m), \quad (6)$$

where $\omega_\Delta = \omega_2 - \omega_1$.

2.2. Mixing Efficiency of MEMS

Figure 1:
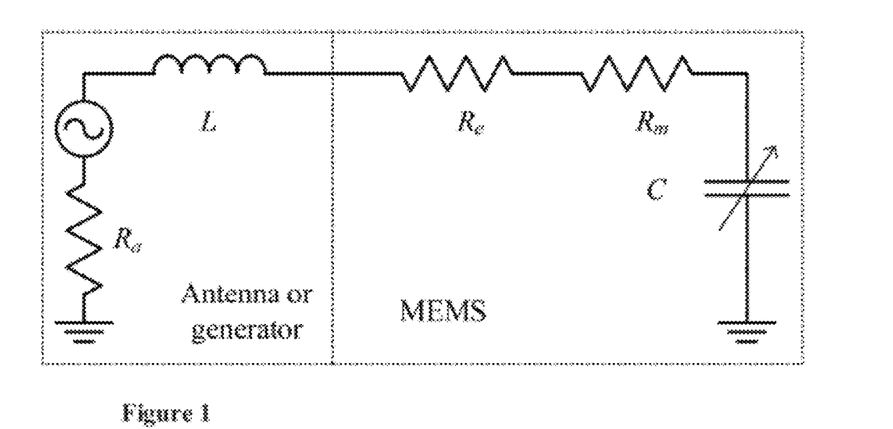
FIG. 1 presents the equivalent circuit of MEMS resonator matched to an antenna or generator according to an embodiment.

Consider a MEMS resonator that is conjugate matched ($L = 1/(\omega^2 C_0)$ and $R_a = R_m + R_e$) to an antenna or equivalently a generator, as shown in FIG. 1. The resistance $R_e$ denotes the conductor losses and $R_m$ the mechanical power dissipation due to friction.

The antenna receives powers $P_1$ and $P_2$ at frequencies $\omega_1$ and $\omega_2$, respectively, producing peak voltages $\hat{V}_1 = \sqrt{2P_1 R_a}$ and $\hat{V}_2 = \sqrt{2P_2 R_a}$. Substituting the voltages into (6) gives $$x(t) = \frac{C_0 R_a \sqrt{P_1 P_2} Q_m}{kg_0}g_n(\omega_\Delta, \omega_m, Q_m)\sin\omega_\Delta t. \quad (7)$$

The movement of the cantilever modulates the capacitance, which can be approximated, when the movement is small, as $$C \approx \frac{C_0}{g_0}x = \frac{C_0^2 R_a \sqrt{P_1 P_2} Q}{kg_0^2}g_n(\omega_\Delta, \omega_m, Q_m)\sin\omega_\Delta t. \quad (8)$$

When the matching inductance of the equivalent circuit of MEMS resonator is $L = 1/(\omega^2 C_0)$, the reflection coefficient of the circuit is given as $$\Gamma = \frac{-j\omega\Delta C}{2/R_a + j\omega\Delta C} \approx \frac{j\omega R_a \Delta C}{2}, \quad (9)$$

where $\Delta C = C - C_0$. The reflection coefficient oscillates at the frequency of $\omega_m$, and therefore harmonically modulates the applied signal. The ratio between the modulated power at one side band and the received power at one frequency, the conversion efficiency is $$\left|\frac{\Delta\hat{\Gamma}}{2}\right|^2 = \left(\frac{Q_e^2 \sqrt{P_1 P_2} Q_m}{4\omega_e kg_0^2}g_n(\omega_\Delta, \omega_m, Q_m)\right)^2, \quad (10)$$

where the electrical quality factor is given as $Q_e = \omega R C_0$ for parallel resonance circuit.

2.3. Equivalent Resistance of the MEMS

The above analysis showed that the conversion efficiency is proportional to the fourth power of the electrical quality factor if the electrical resonance circuit is in resonance at both fundamental frequencies $f_1$ and $f_2$, the electrical bandwidth of the resonator circuit is larger than the mechanical resonance frequency ($\omega_e/Q_e > \omega_m$). The electrical quality factor is limited either by the conductor losses or by the equivalent electrical resistance of the MEMS resonator. Let us next calculate the equivalent electrical resistance due to friction neglecting conductor losses. The equivalent resistance of the MEMS is calculated under conjugate matching, as the highest conversion efficiency occurs in that point. The electrical dissipations must equal to the mechanical power loss in the MEMS resonator, which is given as $$P_{mech} = \frac{\omega_r}{Q} \frac{1}{2} k \hat{x}^2. \tag{11}$$

Substituting (6) into (11), assuming that $P_1 = P_2$ and setting mechanical power loss equal to the electrical losses at both frequencies gives $$R_a = \sqrt{\frac{4kg_0^2}{\omega_r C_0^2 P Q_m}}. \tag{12}$$

The loss tangent of the MEMS capacitor is given as $$\tan\delta = \sqrt{\frac{\omega_r P Q_m}{4kg_0^2 \omega_e^2}}. \tag{13}$$

The previous analysis neglected the modulation reflection coefficient which increases in the fourth power of $R_a$ (in parallel circuit) and decreases the power matched to the equivalent resistance of the MEMS. Therefore, this analysis underestimates the equivalent resistance. However, (13) shows that the loss tangent of the MEMS resonator is typically very low at low input power levels, and therefore the loss tangent of a practical system is dominated by conductor losses. For example, the equivalent loss tangent of a resonator with k=11 N/m, $g_0$=1.2 μm, $f_r$=127 kHz, P=−40 dBm and $Q_m$=250 is 9·10$^{-5}$ at 1 GHz.

3. Experiments and Simulations

3.1. Measured MEMS Device

A capacitive RF MEMS switch was used to experimentally verify the concept. The MEMS switch was bond wired to a grounded coplanar waveguide. A lumped inductor of 36 nH (Q=100 at 1 GHz) was soldered in series with the switch in order to obtain electrical matching. The zero voltage capacitance and the pull-in voltages were measured to be 190 fF and 5 V, respectively. The initial gap height was designed to be 1.2 μm and the mechanical resonance of the switch was found to occur at around 127 kHz. The unpacked MEMS device was kept in vacuum (~1 mBar) during the tests in order to increase its mechanical quality factor, which was below one at atmospheric pressure. A high quality factor could also be achieved by using hermetically packed MEMS component.

3.2. Measurement Setup

Figure 2:
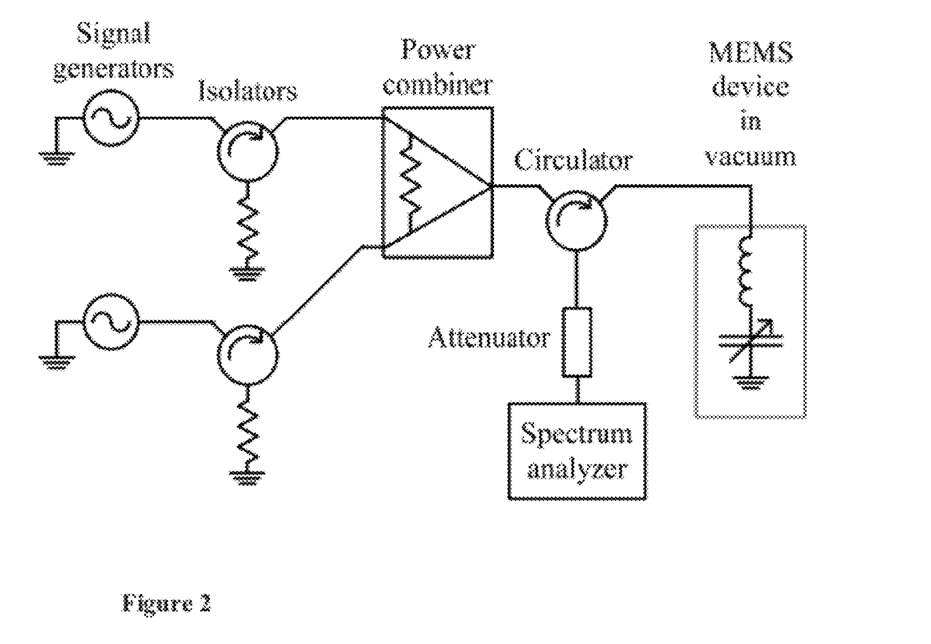
FIG. 2 presents a schematic layout of the measurement setup for measuring the reflected intermodulation signal from the MEMS device according to an embodiment.

A schematic layout of the measurement setup is shown in FIG. 2. Both tones were generated with signal generators (Agilent E8257C and E8257D), combined in power combiner and fed to the MEMS device through a circulator. The generators were isolated to prevent intermodulation in the generators. The reflected signal at an intermodulation frequency was separated with the circulator and measured with spectrum analyzer (Rohde & Schwarz FSP). The nominal frequency range of the isolators and circulator is from 1 to 2 GHz, which was slightly exceeded in the experiments. An attenuator was used in front of the spectrum analyzer in order to suppress the third-order harmonics generated in the mixer of the spectrum analyzer. The signal generators and the spectrum analyzer were controlled with a LabVIEW-based software (http://www.ni.com/labview/).

Figure 3:
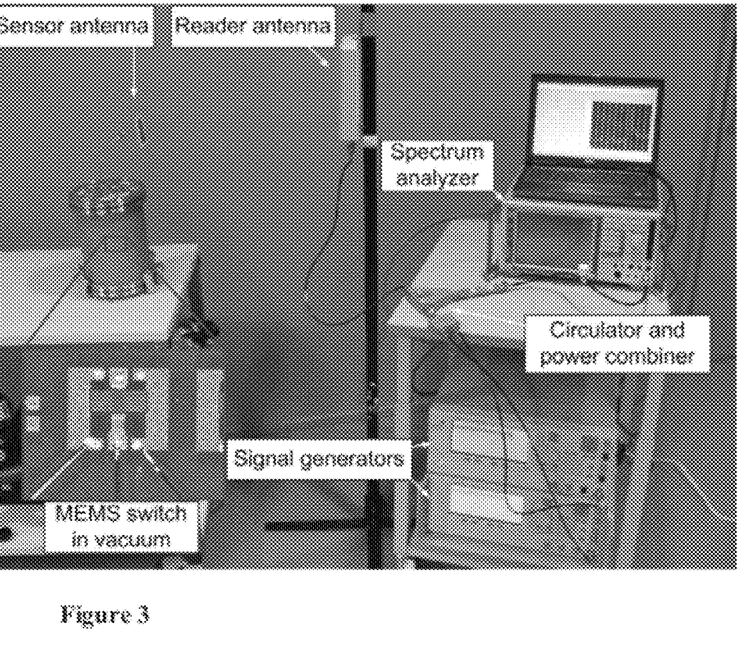
FIG. 3 is a photograph of the measurement setup according to an embodiment.

A photograph of the measurement setup is shown in FIG. 3. The measurement setup of FIG. 3 was used for measuring the reflected signal from the MEMS device at an intermodulation frequency. The setup in the photograph is wireless even though the measurements presented in this paper are made by wired connection.

3.3. Simulated MEMS Device

The purpose of the simulations is to verify the theoretical results and therefore the simulated circuit is equal to that presented in FIG. 1. The initial capacitance, the gap height and the spring constant of the simulated MEMS are equal to those of the experimental device. The spring constant of the switch was calculated from $$k = \frac{27 V_{pi}^2 C_0}{8 g_0^2}, \tag{14}$$

and it was found to be k=11 N/m ($V_{pi}$=5 V is the measured pull-in voltage). The electrical and mechanical quality factors as well as resonance frequencies are selected by fitting the simulated results to the measured ones. Note that the experimental device may suffer from impedance mismatch between the generator and the MEMS, which is included into electrical quality factor in the fitting process. The parameters of the simulated device are listed in Table I. These parameters are also used in analytically calculated curves.

TABLE I

THE PARAMETERS OF THE MEMS USED IN SIMULATIONS AND CALCULATIONS.

| | |
|---|---|
| Zero voltage capacitance | $C_0$ = 190 fF |
| Gap height | $g_0$ = 1.2 μm |
| Spring constant | k = 11 N/m |
| Mechanical resonance frequency* | $f_m$ = 126.75 kHz |
| Electrical resonance frequency* | $f_e$ = 950 MHz |
| Mechanical quality factor* | $Q_m$ = 250 |
| Electrical quality factor* | $Q_e$ = 4 |
| Series resistance of generator and MEMS | R = 220 Ω |
| Series matching inductance | L = 147.7 nH |

*Fitted to the measurements.

The electrical response of the system, including electrical circuit and the MEMS switch, is simulated with Aplac-software (http://web.awrcorp.com/) using harmonic balance analysis.

3.4. Results

Figure 4:
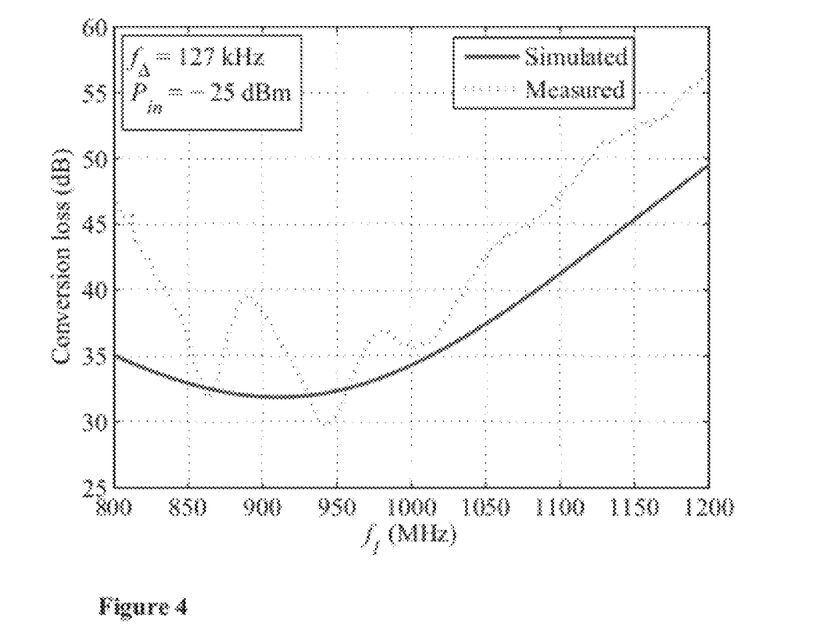
FIG. 4 presents the measured and simulated conversion losses of the MEMS device according to an embodiment.

The realized electrical center frequency of the MEMS device was studied by sweeping both input frequencies, keeping the frequency difference constant, and recording the reflected signal at an intermodulation frequency. FIG. 4 shows the measured and simulated conversion loss as a function of electrical input frequency when the input power is −25 dBm and the frequency difference is 127 kHz.

FIG. 4 shows that the best electrical matching of the experimental device occurs at around 950 MHz. The measured curve introduces strong and fast varying ripple that does not exist in the simulated curve. The nominal frequency range of the isolators and circulator (1-2 GHz) was slightly exceeded and the ripple may therefore derive from multiple reflections in the feeding network. However, the overall trend of the measured curve corresponds well to the simulated one.

Figure 5:
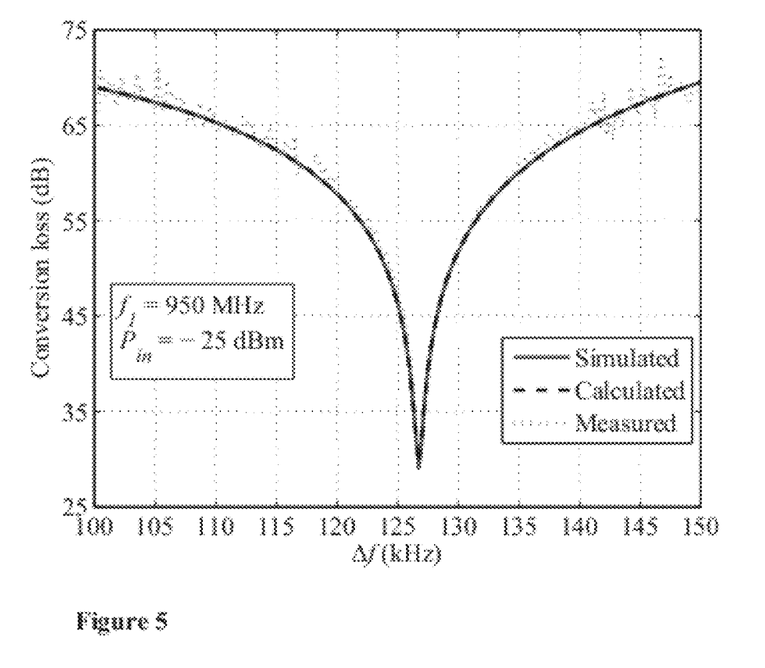
FIG. 5 shows the measured, simulated, and calculated conversion loss of the MEMS device according to an embodiment as a function of the input frequency difference.

The mechanical resonance of the device was studied by fixing one of the input frequencies and sweeping another. FIG. 5 shows the measured, simulated and calculated conversion losses as a function of the frequency difference at −25 dBm input power level. The constant frequency is 950 MHz and the input power level is −25 dBm.

FIG. 5 shows that the simulated and calculated curves are perfectly aligned and that the measured curve correspond very well to these. Note that small deviation at high conversion loss values is due to low signal-to-noise-ratio in the measurements.

Figure 6:
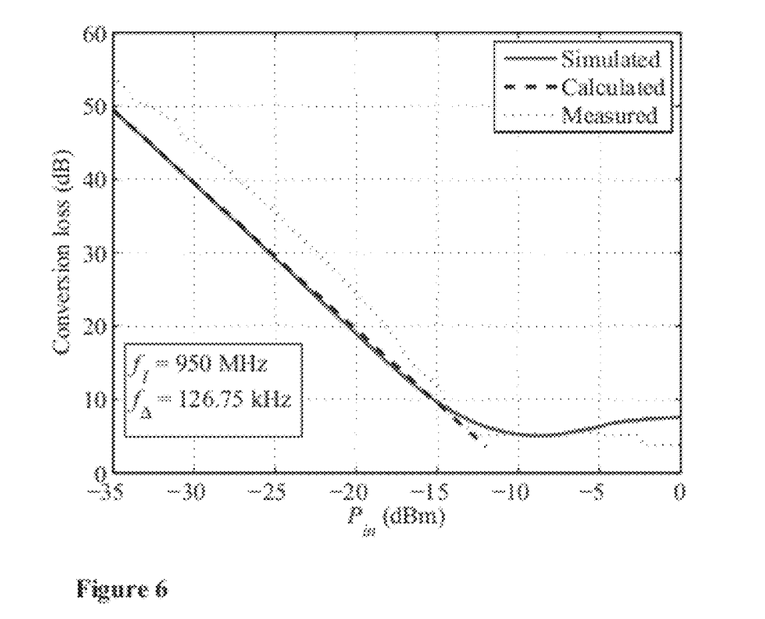
FIG. 6 presents the conversion loss of the MEMS device according to an embodiment as a function of the input power level.

FIG. 6 shows the measured, simulated, and calculated conversion losses of the MEMS device at different input power levels. The lower input frequency is 950 MHz and the frequency difference 126.75 kHz.

FIG. 6 exhibits a good agreement between the simulated and calculated curves at small power levels. The analytically calculated curve would naturally fail at high power levels as small cantilever movement was assumed in the derivation. The measured curve introduces approximately 5 dB larger conversion loss as compared to simulations and calculations at small power levels (<−17 dBm). The mechanical resonance frequency of the switch was found to drift during the experiments and we assume that the 5 dB deviation between the measured and simulated curves occurs because the switch is not excited exactly at its nominal frequency.

4. Utilization as Tag or Sensor

4.1. Detection Distance

The intermodulation conversion efficiency given in (10) of the proposed MEMS device can be tailored to be extremely low by increasing the electrical and mechanical quality factors and decreasing the mechanical resonance frequency and the mechanical spring constant. Therefore, the detection distance of such MEMS sensor is not limited by the conversion loss. For example, considering a MEMS resonator with $Q_e=40$ and otherwise being similar to that used in the experiments, the conversion loss is 47 dB smaller than that of the experimental device enabling efficient mixing (10 dB mixing loss) at −37 dBm input power. Such a device provides approximately 60 m detection distance at 870 MHz RFID-band assuming transmitted power of 20 dBm at one frequency (33 dBm ERP allowed for RFID readers), transmitter antenna gain of 10 dBi, a sensor antenna gain of 0 dB, and a receiver sensitivity of −104 dBm. The corresponding link budget calculation is presented in Table II.

TABLE II

THE CALCULATED LINK BUDGET OF A WIRELESS MEMS SENSOR INTERROGATED WITH A READER DEVICE.

| Transmitted power | $P_t$ = 20 dBm |
|---|---|
| Reader antenna gain | $G_{reader}$ = 10 dBi |
| Free space loss | $\left(\frac{\lambda}{4\pi r}\right)^2 = -67$ dB |
| Sensor antenna gain | $G_{sensor}$ = 0 dBi |
| Received power by the sensor | $P_{sensor}$ = −37 dBm |
| Intermodulation mixing loss | L = −10 dB |
| Sensor antenna gain | $G_{sensor}$ = 0 dBi |
| Free space loss | $\left(\frac{\lambda}{4\pi r}\right)^2 = -67$ dB |
| Reader antenna gain | $G_{reader}$ = 10 dBi |
| Received power at intermodulation frequency | $P_r$ = −104 dBm |

4.2. Wireless Sensor

The presented concept allows wirelessly measuring three MEMS parameters: the mechanical quality factor, the mechanical resonance frequency, and the electrical resonance frequency. Two former parameters are measured by sweeping one of the input frequencies and keeping the other fixed, whereas the latter is obtained by sweeping both input frequencies at the same rate.

The wireless sensor can be realized by designing the MEMS resonator as such that at least one of the three parameters is sensitive to the measured quantity, such as temperature, strain, air pressure or humidity. For example, MEMS fixed-fixed beam structure could be designed such that the beam is either stressed or compressed due to change in temperature or strain. The stress affects the spring constant of the beam changing the mechanical resonance frequency. This interrogation method with wire is used for example for monitoring the mechanical stress in RF MEMS capacitive switches [20].

Similarly, friction of the unpacked cantilever structure is related to the mechanical quality factor and is sensitive to air pressure and humidity. The third possibility is to determine the measured quantity from the electrical resonance frequency. For instance, consider a MEMS pressure sensor with cavity backed membrane. The ambient pressure depresses the membrane affecting the gap height and the initial capacitance. Changed capacitance shifts the electrical resonance of the LC-circuit.

The above description is only to exemplify the invention and is not intended to limit the scope of protection offered by the claims. The claims are also intended to cover the equivalents thereof and not to be construed literally.

LIST OF REFERENCES

[1] A. P. Sample, D. J. Yeager, P. S. Powledge, A. V. Mamishev, and J. R. Smith, "Design of an RFID-based battery-free programmable sensing platform," *IEEE Transactions on Instrumentation and Measurement*, Vol. 57, No. 11, pp. 2608-2615, November 2008.

[2] K. Opasjumruskit, T. Thanthipwan, O. Sathusen, P. Sirinamarattana, P. Gadmanee, E. Pootarapan, N. Wongkomet, A. Thanachayanont, and M. Thamsirianunt, "Self-powered wireless temperature sensors exploit RFID technology," *IEEE Pervasive Computing*, Vol. 5, No. 1, pp. 54-61, January-March 2006.

[3] B. Todd, M. Phillips, S. M. Schultz, A. R. Hawkins, and B. D. Jensen, "Low-cost RFID threshold shock sensors," *IEEE Sensors Journal*, Vol. 9, No. 4, pp. 464-469, April 2009.

[4] L. Reindl, G. Scholl, T. Ostertag, H. Scherr, U. Wolff, and F. Schmidt, "Theory and application of passive SAW radio transponders as sensors," *IEEE Transactions on Ultrasonics, Ferroelectrics, and Frequency Control*, Vol. 45, No. 5, pp. 1281-1292, September 1998.

[5] H. Staras and J. Shefer, Harmonic Radar Detecting and Ranging System for Automotive Vehicles, U.S. Pat. No. 3,781,879, 1972.

[6] E. T. Cant, A. D. Smith, D. R. Reynold and J. L. Osborne, "Tracing butterfly flight paths across the landscape with harmonic radar," *Proceedings of the Royal Society B: Biological Sciences*, Vol. 272, No. 1565, pp. 785-790, April 2005.

[7] J. R. Riley and A. D. Smith, "Design considerations for an harmonic radar to investigate the flight of insects at low altitude," *Computers and Electronics in Agriculture*. Amsterdam, The Netherlands: Elsevier, 2002, Vol. 35, pp. 151-169.

[8] B. G. Colpitts and G. Boiteau, "Harmonic radar transceiver design: Miniature tags for insect tracking," *IEEE Transactions on Antennas and Propagation*, Vol. 52, No. 11, pp. 2825-2832, November 2004.

[9] V. Viikari, J. Saebboe, S. Cheng, M. Kantanen, M. Al-Nuaimi, T. Varpula, A. Lamminen, P. Hallbjörner, A. Alastalo, T. Mattila, H. Seppä, P. Pursula, and A. Rydberg, "Technical solutions for automotive intermodulation radar for detecting vulnerable road users," accepted to *IEEE 69th Vehicular Technology Conference*, Barcelona, Spain, Apr. 26-29, 2009.

[10] L. Dussopt and G. M. Rebeiz, "Intermodulation distortion and power handling in FR MEMS switches, varactors, and tunable filters," *IEEE Transactions on Microwave Theory and Techniques*, Vol. 51, No. 4, pp. 1247-1256, April 2003.

[11] P. Hallbjörner and P. J. Starski, "Expressions for nonlinear effects of MEMS switch beam oscillations," *IEEE Electronics Letters*, Vol. 37, No. 11, pp. 693-694, May 2001.

[12] D. Girbau, N. Otegi, L. Pradell, and A. Lazaro, "Study of intermodulation in RF MEMS variable capacitors," *IEEE Transactions on Microwave Theory and Techniques*, Vol. 54, No. 3, pp. 1120-1130, March 2006.

[13] M. Innocent, P. Wambacq, S. Donnay, H. A. C. Tilmans, W. Sansen, and H. De Man, "An analytic Volterra-series-based model for a MEMS variable capacitor," *IEEE Transactions on Computer-Aided Design of Integrated Circuits and Systems*, Vol. 22, No. 2, pp. 124-131, February 2003.

[14] J. Johnson, G. G. Adams, and N. E. McGruer, "Determination of intermodulation distortion in a MEMS microswitch," *IEEE MTT-S International Symposium Digest*, June 2005, pp. 2135-2138.

[15] A.-C. Wong and C. T.-C. Nguyen, "Micromechanical mixer-filters ("mixlers")," *IEEE Journal on Microelectromechanical Systems*, Vol. 13, No. 1, pp. 100-112, February 2004.

[16] A. T. Alastalo, M. Koskenvuori, H. Seppä, and J. Dekker, "A micromechanical resonating RF mixer," *Proceedings of the 34th European Microwave Conference*, Amsterdam, 11-15 Oct., 2004, pp. 1297-1300.

[17] F. Chen, J. Brotz, U. Arslan, C.-C. Lo, T. Mukherjee, and G. K. Fedder, "CMOS-MEMS resonant RF mixer-filters," *Proceedings of the 18th IEEE International Conference on Micro Electro Mechanical Systems*, Miami, USA, 30 Jan.-3 Feb. 2005, pp. 24-27.

[18] A. Uranga, J. Verd, J. L. Lopez, J. Teva, G. Abadal, F. Torres, J. Esteve, F. Perez-Murano, and N. Barniol, "Fully integrated mixer based on VHF CMOS-MEMS clamped-clamped beam resonator," *IEEE Electronics Letters*, Vol. 43, No. 8, pp. 452-454, April 2007.

[19] G. M. Rebeiz, *RF MEMS, Theory, Design, and Technology*. New York: Wiley, 2003.

[20] C. Palego, S. Hadler, B. Baloglu, Z. Peng, J. C. M. Hwang, H. F. Nied, D. I. Forehand, and C. L. Goldsmith, "Microwave intermodulation technique for monitoring the mechanical stress in RF MEMS capacitive switches," *IEEE MTT-S International Symposium Digest*, Jun. 15-20, 2008, pp. 29-32.

The invention claimed is:

1. A wireless sensor, comprising a MEMS resonator and an antenna directly matched thereto, the wireless sensor adapted to emit electromagnetic signal at an intermodulation frequency when illuminated by electromagnetic energy at first and second frequencies,
   wherein at least one of the first and second frequencies is swept in order to measure a MEMS parameter of the MEMS resonator, the MEMS parameter including one of: a mechanical quality factor, a mechanical resonance frequency or an electrical resonance frequency.

2. The wireless sensor of claim 1, wherein the sensor is comprised in a single silicon chip.

3. The wireless sensor of claim 2, wherein the sensor is a passive sensor and the single silicon chip does not include a power rectifier nor a power source.

4. The wireless sensor of claim 1, wherein the sensor comprises a logic circuit.

5. The wireless sensor of claim 2, wherein the sensor comprises a logic implemented by a CMOS circuit manufacture on said single silicon chip.

6. The wireless sensor of claim 1, wherein
   the MEMS resonator has three MEMS parameters: the mechanical quality factor, the mechanical resonance frequency, and the electrical resonance frequency; and
   at least one of the three MEMS parameters is sensitive to a measured quantity.

7. The wireless sensor of claim 6, wherein the sensor is adapted to provide the intermodulation frequency in the frequency range from 100 kHz to 300 GHz.

8. A method of reading a wireless sensor including a MEMS resonator and an antenna directly matched thereto, the wireless sensor adapted to emit electromagnetic signal at an intermodulation frequency when illuminated by electromagnetic energy at two different frequencies, the method comprising:
   illuminating the wireless sensor with electromagnetic energy at a first and second frequencies;
   sweeping at least one of the first and second frequencies;
   receiving the intermodulation signal emitted by the wireless sensor in response to said electromagnetic energy at the first and second frequencies; and
   measuring the mechanical quality factor of the MEMS resonator by sweeping the first frequency and keeping the second frequency fixed.

9. The method of claim 8, wherein the first and second frequencies are in the frequency range from 100 kHz to 300 GHz.

10. The method of claim 8, wherein the mechanical quality factor of the MEMS resonator is sensitive to a measured quantity, the measured quantity being at least one of temperature, strain, air pressure and humidity.

11. The method of claim 10, wherein the measured quantity is at least one of temperature, strain, air pressure and humidity.

12. The wireless sensor of claim 6, wherein the measured quantity is at least one of temperature, strain, air pressure and humidity.

13. A reader for reading a wireless sensor comprising a MEMS resonator and an antenna directly matched thereto, the wireless sensor adapted to emit electromagnetic signal at an intermodulation frequency when illuminated by electromagnetic energy at two different frequencies, the reader comprising:

signal generators configured to generate first and second signals respectively at first and second frequencies, at least one of the signal generators being further configured to sweep the respective first or second frequency, wherein the first or second frequency is swept in order to measure a MEMS parameter of the MEMS resonator, the MEMS parameter including one of a mechanical quality factor, a mechanical resonance frequency or an electrical resonance frequency; and antenna connected to the signal generators and configured to illuminate the wireless sensor with electromagnetic energy at the first and second frequencies and receive the electromagnetic signal emitted by the wireless sensor in response to said electromagnetic energy at the first and second frequencies.

14. A method of reading a wireless sensor including a MEMS resonator and an antenna directly matched thereto, the wireless sensor adapted to emit electromagnetic signal at an intermodulation frequency when illuminated by electromagnetic energy at two different frequencies, the method comprising:

illuminating the wireless sensor with electromagnetic energy at a first and second frequencies;

sweeping at least one of the first and second frequencies;

receiving the intermodulation signal emitted by the wireless sensor in response to said electromagnetic energy at the first and second frequencies; and measuring the mechanical resonance frequency of the MEMS resonator by sweeping the first frequency and keeping the second frequency fixed.

15. The method of claim 14, wherein the mechanical resonance frequency of the MEMS resonator is sensitive to a measured quantity, the measured quantity being at least one of temperature, strain, air pressure and humidity.

16. The method of claim 15, wherein the measured quantity is at least one of temperature, strain, air pressure and humidity.

17. A method of reading a wireless sensor including a MEMS resonator and an antenna directly matched thereto, the wireless sensor adapted to emit electromagnetic signal at an intermodulation frequency when illuminated by electromagnetic energy at two different frequencies, the method comprising:

illuminating the wireless sensor with electromagnetic energy at a first and second frequencies;

sweeping at least one of the first and second frequencies;

receiving the intermodulation signal emitted by the wireless sensor in response to said electromagnetic energy at the first and second frequencies; and measuring the electrical resonance frequency of the MEMS resonator by sweeping the first and second frequencies at a same rate.

18. The method of claim 17, wherein the electrical resonance frequency of the MEMS resonator is sensitive to a measured quantity, the measured quantity being at least one of temperature, strain, air pressure and humidity.

19. The method of claim 18, wherein the measured quantity is at least one of temperature, strain, air pressure and humidity.

* * * * *